United States Patent
Cho et al.

(10) Patent No.: US 8,164,727 B2
(45) Date of Patent: Apr. 24, 2012

(54) LIQUID CRYSTAL DISPLAY WITH REFRACTIVE INDEX MATCHED ELECTRODES

(75) Inventors: Jaehee Cho, Troy, NY (US); E. Fred Schubert, Troy, NY (US); Xing Yan, Troy, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 240 days.

(21) Appl. No.: 12/768,975

(22) Filed: Apr. 28, 2010

(65) Prior Publication Data

US 2011/0128489 A1    Jun. 2, 2011

Related U.S. Application Data

(60) Provisional application No. 61/264,968, filed on Nov. 30, 2009.

(51) Int. Cl.
G02F 1/1335    (2006.01)
G02F 1/13      (2006.01)
H01L 21/00     (2006.01)

(52) U.S. Cl. ........ 349/137; 349/139; 349/187; 349/104; 349/106; 438/30

(58) Field of Classification Search .......... 349/139, 349/137, 140, 143, 144, 147, 187, 104, 106; 438/30
See application file for complete search history.

(56) References Cited

U.S. PATENT DOCUMENTS

| | | | |
|---|---|---|---|
| 3,971,065 A | | 7/1976 | Bayer |
| 4,488,785 A | | 12/1984 | Kohashi |
| 5,177,627 A | * | 1/1993 | Ishiwata et al. ............ 349/162 |
| 5,337,186 A | | 8/1994 | Oikawa et al. |
| 5,812,227 A | | 9/1998 | Toshida et al. |
| 6,853,360 B1 | | 2/2005 | Webb |
| 6,992,436 B2 | * | 1/2006 | Seo ........................... 313/504 |
| 7,019,890 B2 | | 3/2006 | Meredith et al. |
| 7,190,416 B2 | | 3/2007 | Paukshto et al. |
| 7,301,274 B2 | * | 11/2007 | Tanaka et al. ............. 313/504 |
| 7,557,870 B2 | | 7/2009 | Saccomanno et al. |
| 2002/0053871 A1 | * | 5/2002 | Seo ........................... 313/504 |
| 2005/0156520 A1 | * | 7/2005 | Tanaka et al. ............. 313/512 |
| 2006/0066803 A1 | | 3/2006 | Aylward et al. |
| 2006/0103782 A1 | | 5/2006 | Adachi et al. |
| 2011/0128489 A1 | * | 6/2011 | Cho et al. ................. 349/137 |

FOREIGN PATENT DOCUMENTS

| EP | 0 382 567 A2 | 8/1990 |
|---|---|---|
| WO | WO 2004/114006 A1 | 12/2004 |

OTHER PUBLICATIONS

Poxson, D. J. et al., "Quantification of porosity and deposition rate of nanoporous films grown by oblique-angle deposition," Applied Physics Letters 93, 101914 (2008).

* cited by examiner

*Primary Examiner* — Brian Healy
(74) *Attorney, Agent, or Firm* — RatnerPrestia

(57) ABSTRACT

Image display structures and methods of forming image display structures are provided. The image display structure includes a liquid crystal layer disposed between opposing substrates and first and second transparent electrodes disposed between the liquid crystal layer and the respective opposing substrates. At least one of the first and second transparent electrodes includes a porosity such that a refractive index of the respective transparent electrode is reduced.

26 Claims, 9 Drawing Sheets

LIQUID CRYSTAL DISPLAY WITH REFRACTIVE INDEX MATCHED ELECTRODES

CROSS-REFERENCE TO RELATED APPLICATIONS

This application is related to and claims the benefit of U.S. Provisional Application No. 61/264,968 entitled LIQUID CRYSTAL DISPLAY WITH REFRACTIVE INDEX MATCHED ELECTRODES filed on Nov. 30, 2009, the contents of which are incorporated herein by reference.

FIELD OF THE INVENTION

The present invention relates to the field of display devices and, more particularly, to methods of forming image display structures and image display structures including at least one transparent electrode having a porosity such that the refractive index of the transparent electrode becomes substantially similar to at least one other component of the image display structure.

BACKGROUND OF THE INVENTION

Liquid crystal display (LCD) technology is dominant for many flat panel display applications, ranging from low-power handheld mobile phones to large scale high definition (HD) televisions. LCD systems typically include a liquid crystal material, switching devices (such as thin-film transistors (TFTs)) and color filters. In operation, light from a light source passes through all of the components of the LCD system until it reaches a display screen, to produce an image.

In general, optical loss mechanisms may occur as the light is transmitted through various components of the system. Although it is desirable that the optical efficiency of the LCD system be as high as possible, typically less than about 5% of the total light output from the light source is generally available at the display screen of the conventional LCD system.

The liquid crystal material is typically provided between two transparent electrodes, such as indium-tin-oxide (ITO) electrodes, which induce a bias to the liquid crystal material. One mechanism for optical loss in the LCD system may occur because of a refractive index mismatch between the ITO electrodes and other adjacent components. In general, it is desirable to reduce the optical loss in the LCD system without deteriorating the material properties of each component.

SUMMARY OF THE INVENTION

The present invention is embodied in an image display structure. The image display structure includes a liquid crystal layer disposed between opposing substrates and first and second transparent electrodes disposed between the liquid crystal layer and the respective opposing substrates. At least one of the first and second transparent electrodes includes a porosity such that a refractive index of the respective transparent electrode is reduced.

The present invention is also embodied in an apparatus for displaying an image. The apparatus includes a light source for providing incident light in a wavelength band, a plurality of different color filters each configured to transmit one band of light within the wavelength band and a display structure disposed between the light source and the plurality of different color filters. The display structure includes first and second transparent electrodes and a liquid crystal layer disposed between the first and second transparent electrodes. At least one of the first and second transparent electrodes includes a porosity such that a refractive index of the respective transparent electrode is reduced.

The present invention is further embodied in a method of forming an image display structure. The method includes disposing a liquid crystal layer between opposing substrates, disposing first and second transparent electrodes between the liquid crystal layer and the respective opposing substrates and forming at least one of the first and second transparent electrodes such that the respective transparent electrode has a refractive index modified toward at least one of a refractive index of the liquid crystal layer and a refractive index of the adjacent substrate.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawing are the following figures.

DETAILED DESCRIPTION OF THE INVENTION

Aspects of the present invention relate to methods of forming image display structures and image display structures including a liquid crystal layer formed between transparent electrodes, where a refractive index of at least one of the transparent electrodes is substantially similar to at least one other component of the image display structure, such as the liquid crystal layer or an other adjacent material. According to an exemplary embodiment, the transparent electrode may include a porosity such that the transparent electrode has a refractive index between a refractive index of the liquid crystal layer and a refractive index of the other material, such as a substrate disposed on the transparent electrode. In general, exemplary transparent electrodes may be formed to reduce Fresnel reflection at interfaces of adjacent material layers with the transparent electrode. By including refractive-index-modified electrodes (where the refractive index is similar to an adjacent material layer), an amount of light transmitted through the exemplary display structure may be increased, thus providing a higher optical efficiency, as well as a lower energy consumption by the display structure.

Figure 1:
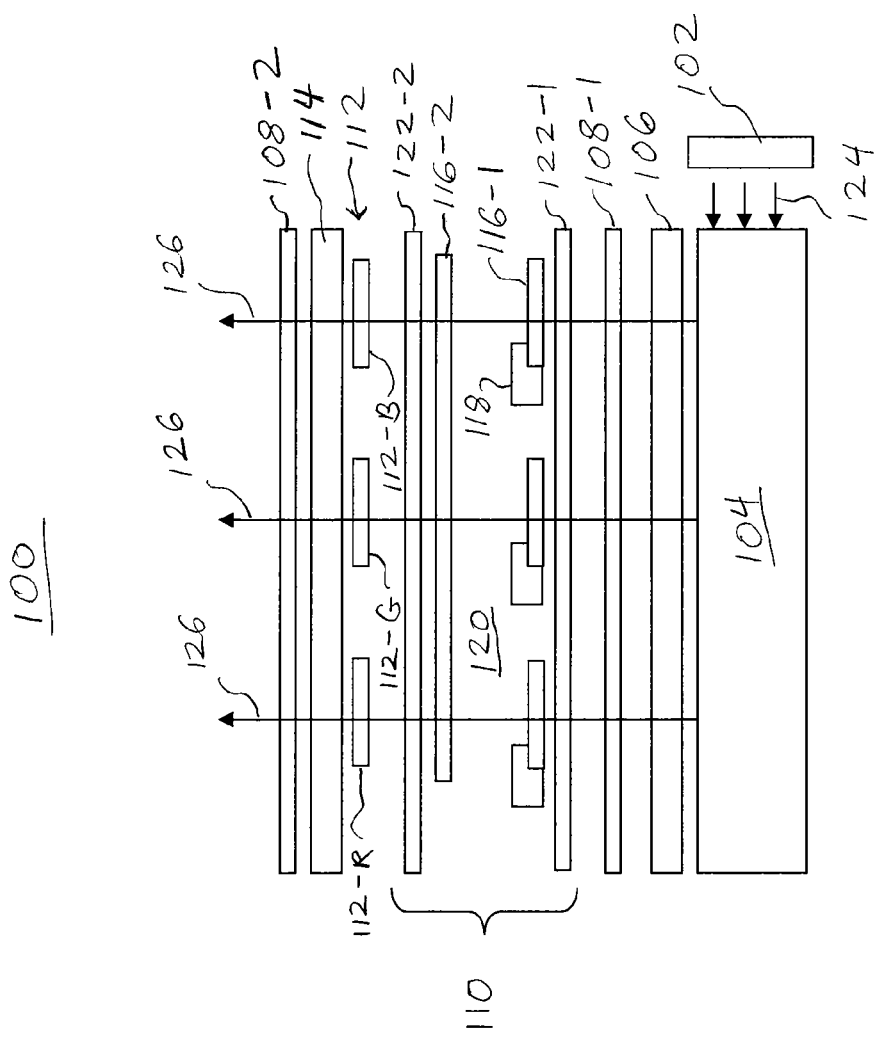
FIG. 1 is an exploded cross-section diagram of an apparatus for displaying an image, according to an exemplary embodiment of the present invention.

FIG. 1 is a cross-section diagram of exemplary apparatus 100 for displaying an image. Apparatus 100 includes light source 102, diffuser 104, liquid crystal display structure 110 (also referred to herein as display structure 110) and color filters 112 formed on substrate 114. The combination of light source 102 and diffuser 104 may be referred to as a backlight unit. Apparatus 100 may also include optical film 106. Optical film 106 may include, for example, a brightness enhancement film (BEF) or a dual brightness enhancement film (DBEF). BEFs typically include prismatic microstructures, and may enhance brightness by collimating more light into a narrower region. DBEFs typically include stacked multilayer structures and are based on a reflective polarizer film. DBEFs may enhance brightness by recycling a portion of the light that may be lost via a polarizer (e.g., polarizer 108-1). Display structure 110 is disposed between polarizers 108-1, 108-2.

Light source 102 may provide incident light 124 to diffuser 104 in a wavelength range of interest, such as the visible spectrum (e.g., about 300-800 nm). Light source 102 may include one or more light sources capable of providing incident light 124 in a plurality of wavelengths bands (e.g., red light, green light and blue light) in the wavelength range of interest. In an exemplary embodiment, light source 102 includes a plurality of light emitting diodes (LEDs) for respectively transmitting red, blue and green light.

Diffuser 104 may receive incident light 124 from light source 102 and may provide light rays 126 through the remainder of apparatus 100, including display structure 110 and color filters 112. In general, the backlight unit may include a waveguide and reflectors, as well as other components, such as brightness enhancement films (BEFs), to produce light rays 126 of a suitable intensity and distribution throughout display structure 110.

Display structure 110 may include liquid crystal layer 120 disposed between lower and upper substrates 122-1, 122-2. First and second transparent electrodes 116-1, 116-2 apply an electric field to liquid crystal layer 120. First transparent electrode 116-1 is typically called a pixel electrode, because it is independently arranged for every pixel in apparatus 100. Second transparent electrode 116-2 is typically called a common electrode, because it typically covers substantially the entire substrate 122-2. First and second electrodes 116-1, 116-2 are respectively arranged at the lower and upper substrates 122-1, 122-2 that sandwich liquid crystal layer 120.

Display structure 110 may also include switching devices 118, such as transistors, for switching a pixel such that the pixel controls a transmittance of light rays 126, incident from diffuser 104. In an exemplary embodiment, switching devices 118 include thin film transistors (TFTs).

Color filters 112 may include respective red, green and blue color filters, 112-R, 112-G, 112-B, arranged in any suitable pattern, such as a Bayer pattern. An example Bayer pattern is described in U.S. Pat. No. 3,971,065 to Bayer, the contents of which are incorporated herein by reference. Color filters 112 may include bandpass filters which pass one of a plurality of wavelength bands, while blocking the remaining wavelength bands.

In operation, switching elements 118 apply electrical signals to transparent electrodes 116-1, 116-2 such that an electric field is induced across liquid crystal layer 120. Liquid crystal layer 120 changes its alignment in accordance with the electric field. Polarizers 108-1, 108-2 are used to apply an alternating voltage to liquid crystal layer 120, to bias liquid crystal layer 120. In this manner, the intensity of light rays 126 transmitted through liquid crystal layer 120 may be adjusted and passed through respective color filters 112-R, 112-G, 112-B, to produce an output color image.

Substrates 114, 122 may include any suitable material transparent to light in the wavelength region of interest, including, but not limited to glass (i.e., silicon dioxide ($SiO_2$)), quartz, polyester (PET) and aluminosilicate. Liquid crystal layer 120 may include an suitable liquid crystal material, such as, but not limited to, thermotropic liquid crystals.

A suitable light source 102, diffuser 104, optical film 106, polarizers 108, color filters 112 and switching devices 118 may be understood by one of skill in the art from the description herein.

In FIG. 1, apparatus 100 is described using an interior light source (i.e., a backlight unit). In this configuration, apparatus 100 may be considered to illustrate a transmissive LCD apparatus. According to another embodiment, apparatus 100 may include an external light source (not shown), rather than a backlight unit, to form a reflective LCD apparatus. According to yet another embodiment, apparatus 100 may include a backlight unit and an external light source, to form a transreflective LCD apparatus.

In display structure 110, at least one of first electrode 116-1 or second electrode 116-2 may be formed with a porosity (electrode 116 is also referred to herein as a porous electrode). The porosity of electrode 116 may be selected such that a refractive index of the porous electrode 116 is substantially similar to (or substantially matches) a refractive index of at least one adjacent material. According to another embodiment, the porosity of electrode 116 may be selected such that it is between the refractive indices of material layers at interfaces with porous electrode 116, such as liquid crystal layer 120 and substrate 122. Electrodes 116 may be formed from any suitable transparent conductive material, such as oxides including, but not limited to, ITO, zinc oxide (ZnO) or aluminum zinc oxide (AlZnO).

It is understood that transparent electrode 116 may be formed with a porosity which covers substantially all of electrode 116 or only a portion of electrode 116. For example, a porosity may be formed in a region of common electrode 116-2 through which light passes.

Figure 2A:
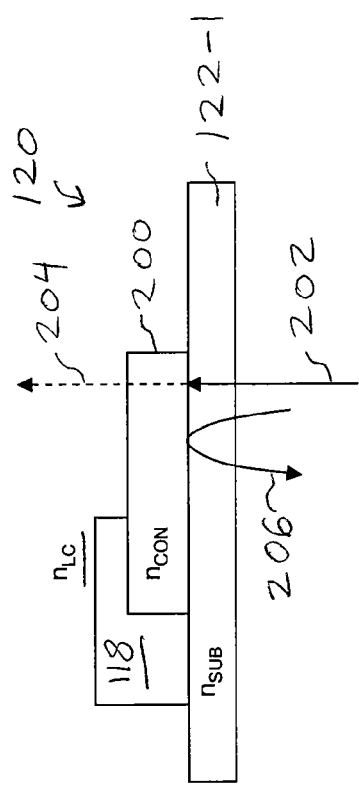
FIG. 2A is a cross-section diagram of a portion of a conventional liquid crystal display structure, illustrating Fresnel reflection of light at an electrode/substrate interface of the display structure.
Figure 2B:
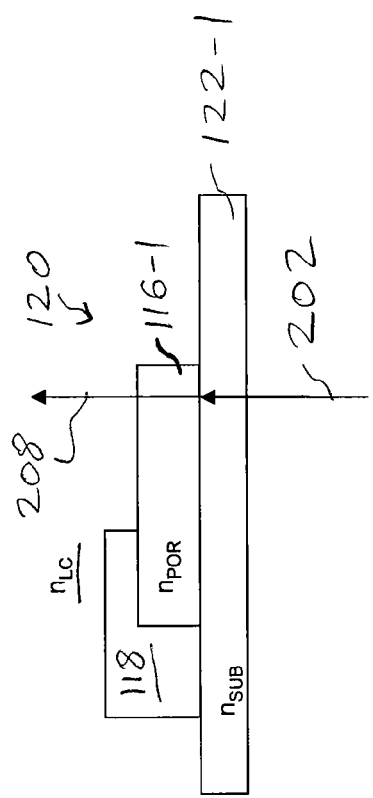
FIG. 2B is a cross-section diagram of a portion of the exemplary display structure shown in FIG. 1, illustrating transmission of light through the display structure.
Figure 2C:
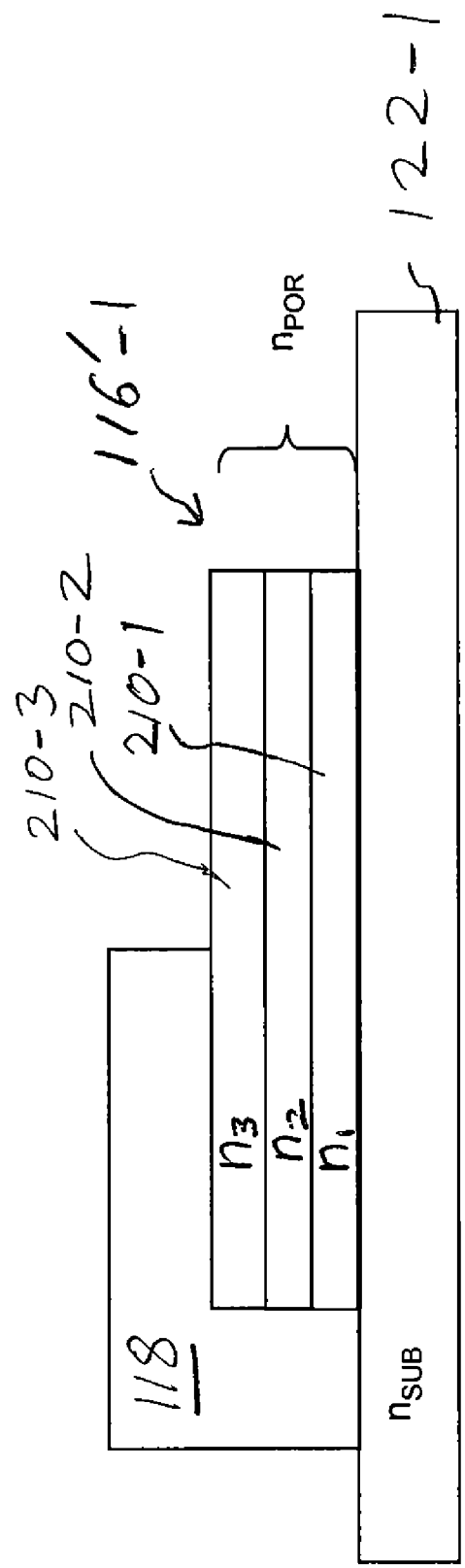
FIG. 2C is a cross-section diagram of a portion of the display structure shown in FIG. 1, according to another exemplary embodiment of the present invention.

Referring next to FIGS. 2A-2C, the refractive-index-adjusting properties of porous electrode 116 are described. In particular, FIG. 2A is a cross-section diagram of a portion of a display structure illustrating transmission of incident light 202 through conventional transparent electrode 200; FIG. 2B is a cross-section diagram of a portion of display structure 110 illustrating transmission of incident light 202 through porous electrode 116-1; and FIG. 2C is a cross-section diagram of a portion of display structure 110 including graded porous electrode structure 116'-1.

Referring to FIG. 2A, the illustrated display structure includes conventional dense transparent electrode 200 (i.e., electrode 200 does not include any porosity). Conventional electrode 200 typically includes a refractive index ($n_{CON}$) that is greater than the refractive indices ($n_{LC}$, $n_{SUB}$) of the adjacent material layers. As an example, substrate 122-1 may include a refractive index ($n_{SUB}$) of about 1.46 (for glass), liquid crystal layer 120 may include a refractive index ($n_{LC}$) of about 1.54 and conventional electrode 202 may include a refractive index ($n_{CON}$) of about 2.1 (for ITO).

Although dense conventional electrode 200 typically includes properties of high optical transmittance (e.g., greater than about 80%) and low sheet resistance (e.g., between about 300-800 Ω/sq for dense ITO with a thickness between about 50-270 nm), the mismatch in refractive indices results in Fresnel reflection losses 206 at the interface between substrate 122-1 and electrode 200. Accordingly, a portion 206 of incident light 202 may be lost due to Fresnel reflection at the interface between electrode 200 and substrate 122-1, with a remaining portion 204 being transmitted through liquid crystal layer 120. Although not shown, a further portion of light may be lost by Fresnel reflection at the interface between liquid crystal layer 120 and electrode 200. Accordingly, portion 204 of light transmitted through liquid crystal layer 120 may include optical losses due to Fresnel-reflected light at each interface with electrode 200. In general, Fresnel reflection may increase as the refractive index difference between two materials increase. Accordingly, it is desirable to adjust the refractive index of the transparent electrode to be similar to the refractive indices of the adjacent material layers (e.g., substrate 122-1 and liquid crystal layer 120).

Referring to FIG. 2B, transmission of incident light 202 through display structure 110 having porous electrode 116-1 is now described. Electrode 116-1 may include a porosity which adjusts the refractive index ($n_{POR}$) to be between the respective refractive indices $n_{LC}$, $n_{SUB}$ of liquid crystal layer 120 and substrate 122-1. In general, the porosity directly relates to the refractive index, such that electrode 116-1 may be formed with a predetermined porosity to produce a suitable refractive index. The porosity may be selected to minimize Fresnel reflection losses such that a majority of incident light 202 is transmitted through liquid crystal layer 120 as transmitted light 208. In general, the porosity of electrode 116-1 may be selected to be similar to the refractive indices of at least one of the adjacent material layers (e.g., liquid crystal layer 120 and/or substrate 122-1). According to an exemplary embodiment, electrode 116-1 may be formed with a porosity between about 1% to about 80%.

In an exemplary embodiment, porous electrode 116 is formed with a nanometer size porosity, which changes the refractive index of electrode 116 without substantially changing other material qualities of electrode 116. In general, the feature size of the nanopores may be selected to be much smaller (at least about ⅕ less) than the wavelength of visible light (e.g., 300-800 nm), so that Mie and Rayleigh scattering may be neglected.

Referring next to FIG. 2C, an alternate porous electrode 116'-1 is shown. Porous electrode 116'-1 includes at least two porous electrode layers 210. In FIG. 2C, three porous electrode layers 210-1, 210-2, 210-3 are illustrated. Each electrode layer 210 may include a different porosity and, accordingly, different respective refractive indices $n_1$, $n_2$, $n_3$. Electrode layers 210-1, 210-2, 210-3 may be formed with a graded refractive index, where the refractive indices $n_1$, $n_2$, $n_3$ of the individual porous electrode layers 210 may gradually vary from a high refractive index to a low refractive index (or vice versa). Accordingly, the refractive index $n_{POR}$ of porous electrode 116'-1 is, in general, an average of the refractive index of each electrode layer 210. Therefore, the refractive index $n_{POR}$ of porous electrode 116'-1 may be gradually varied to reduce the refractive index mismatch, thereby minimizing Fresnel reflection at the interfaces of porous electrode 116'-1.

Figure 3:
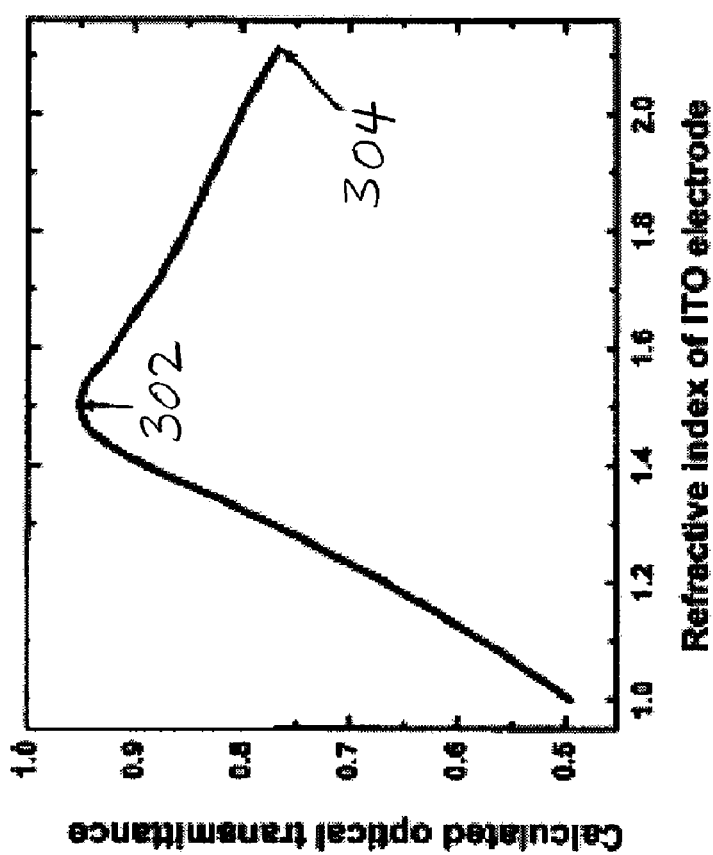
FIG. 3 is a graph of optical transmittance as a function of refractive index, illustrating the effects of porosity on a transparent electrode.

Referring next to FIG. 3, a graph of optical transmittance as a function of refractive index of a transparent electrode is shown, based on a simulated device structure including a bottom glass (SiO$_2$) substrate, a bottom ITO electrode, a liquid crystal layer, a top ITO electrode and a top glass substrate. The thicknesses of the bottom glass substrate, top glass substrate and liquid crystal layer are each 1 nm, and the thicknesses of the bottom and top ITO electrodes are 50 nm and 150 nm, respectively.

A refractive index of 1.54 was used for the liquid crystal layer. Refractive indices of ITO and SiO$_2$ were linearly interpolated from a refractive index ($n_{ITO}$) equal to 2.17 (for a wavelength of 400 nm) to $n_{ITO}$ equal to 2.00 (for a wavelength of 700 nm) for ITO, and from a refractive index ($n_{glass}$) equal 1.47 (for a wavelength of 400 nm) to $n_{glass}$ equal to 1.45 (for a wavelength of 700 nm) for SiO$_2$. In the calculation, the wavelength range of interest included the visible spectrum (e.g., about 400-700 nm). The incident-angle range of interest was 0° (for normal incidence) to about 88°, which corresponds with real scenarios in which light rays from a backlight unit is permitted to enter the liquid crystal from substantially all directions.

FIG. 3 shows that the angle-averaged (i.e., 0° to 88°) optical transmittance increases from about 50% at $n_{ITO}$ of 1, to a maximum of about 95% at $n_{ITO}$ of 1.5, and then decreases to about 75% at $n_{ITO}$ of 2.1. As illustrated in FIG. 3, the enhanced transmittance may be achieved by refractive index matching of the ITO electrode. In FIG. 3, element 302 represents the optical transmittance through the simulated LCD device structure for an index-matched ITO electrode and element 304 represents the optical transmittance of a conventional dense ITO electrode. The improvement of optical transmittance may be numerically calculated as a function of the refractive index of the ITO electrode. In general, about a 24% improvement in optical transmittance may be shown by changing from a conventional dense ITO electrode (element 304) to a porous ITO electrode (element 302).

Figure 4:
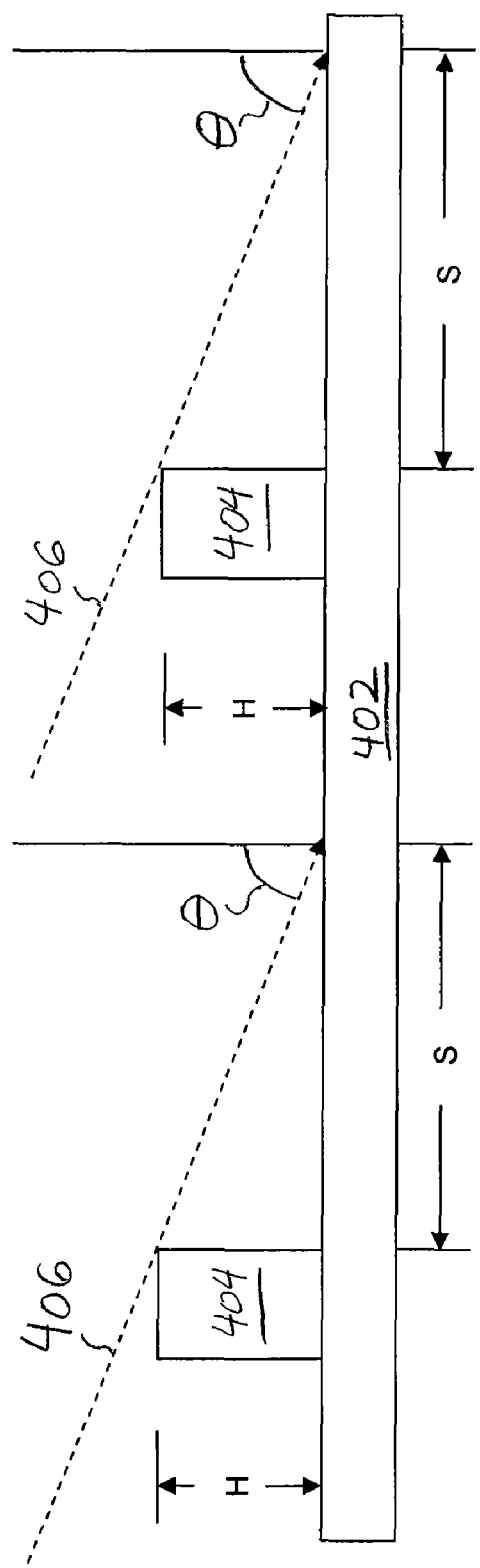
FIG. 4 is a cross-section diagram of a portion of a porous electrode, illustrating the formation of nano pillars, according to an exemplary embodiment of the present invention.

Referring next to FIG. 4, an exemplary method of forming a porous electrode using oblique-angle deposition is shown. In oblique-angle deposition, a random growth fluctuation on substrate 402 of nano pillars 404 is produced by vapor flux 406, which is directed to substrate 402 at angle θ. The random growth fluctuation produces a shadow region (S) such that subsequent vapor flux 406 incident at a high angle does not reach shadow region S, but deposits, instead on a high edge of nano pillars 404. In these films, gaps between nano pillars 404 may be sufficiently small to limit optical scattering. In general, the refractive index of the porous electrode may be determined by a porosity weighted refractive indices of air (due to the nanopores) and the dense electrode material. As described further in FIG. 6, the refractive index of the porous electrode may be adjusted by selection of the deposition angle.

In an example embodiment, nanorod thin films may be grown by oblique-angle deposition using electron-beam evaporation. The vapor-source materials may include, for example, ITO, to form ITO nanorod layers. A distance between substrate 402 and the source materials may be about 28 cm. During the deposition, oxygen gas (O$_2$) may be supplied at a partial pressure of about 2×10$^{-4}$ torr, while maintaining substrate 402 at a fixed position. In an exemplary embodiment, an apparatus for oblique-angle deposition may include a sample stage for loading substrate 402 with a controllable polar-angle rotation. For each layer of the nanorod film, the sample stage may be at a fixed polar-angle, so that the substrate may include a predetermined tilt angle with respect to a direction of the vapor flux 406. Accordingly, one or more porous electrode layers may be formed, with the porosity selected to adjust the refractive index of each individual electrode layer.

Figure 5B:
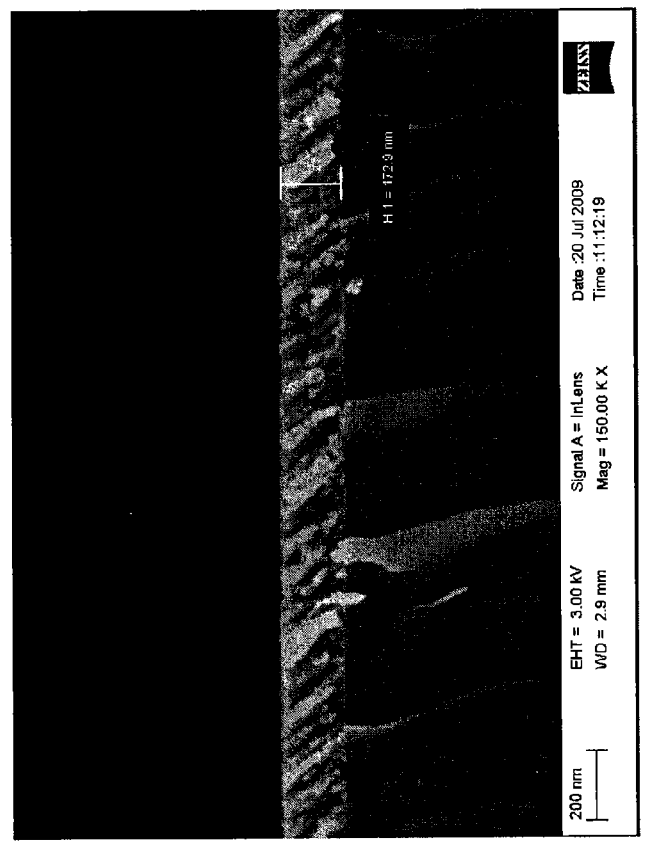
FIG. 5B is a cross-sectional view image of the porous electrode shown in FIG. 5A.
Figure 5A:
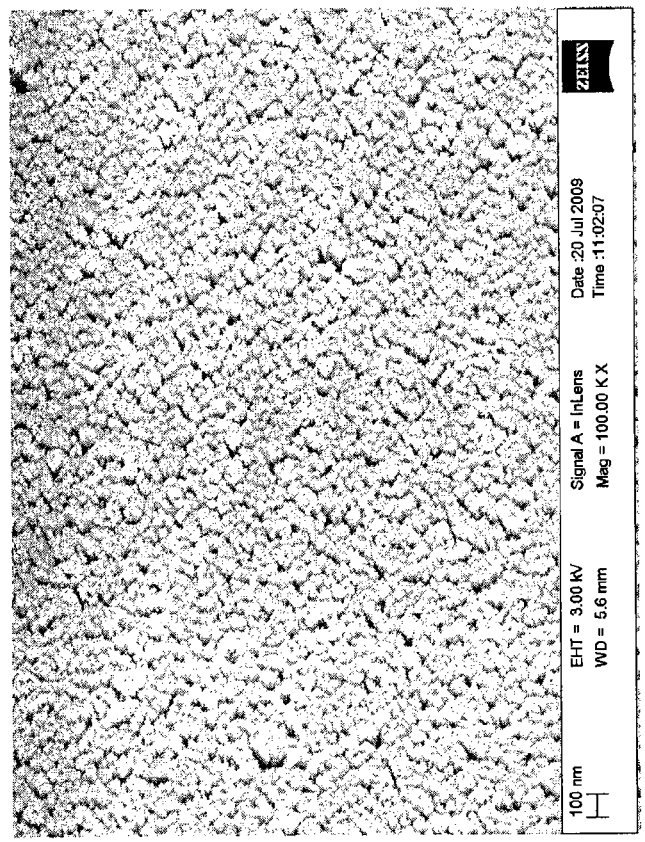
FIG. 5A is an overhead view image of an example porous electrode, according to an exemplary embodiment of the present invention.

Referring to FIGS. 5A and 5B, an example porous electrode formed using oblique-angle deposition is shown. In particular, FIG. 5A is an overview of an example porous electrode; and FIG. 5B is a cross-sectional view of the porous electrode shown in FIG. 5A. In FIG. 5B, the height of the nano pillars is about 172.9 nm.

Figure 6:
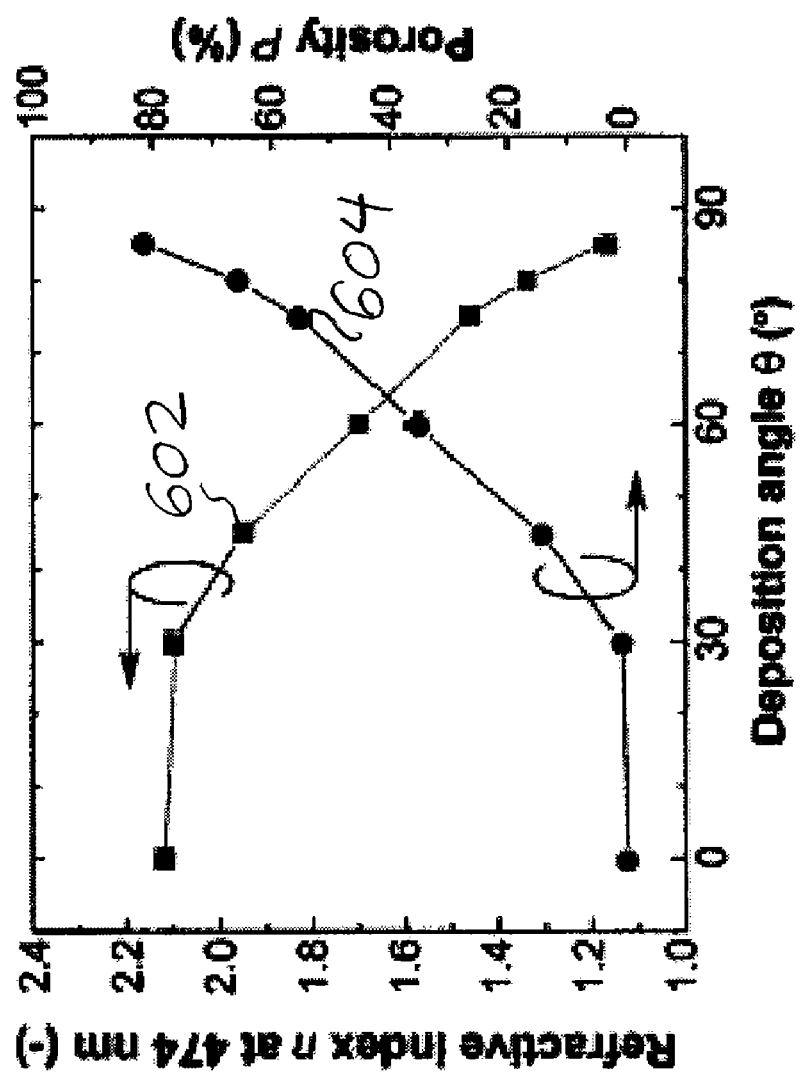
FIG. 6 is a graph of refractive index and porosity as a function of deposition angle for forming a porous electrode, according to an exemplary embodiment of the present invention.

Referring to FIG. 6, a graph of refractive index and porosity as a function of deposition angle for an oblique-angle deposited ITO electrode is shown. In FIG. 6, curve 602 represents the refractive index (at 474 nm) of the electrode as a function of deposition angle (θ) and curve 604 represents the porosity (as a percentage) of the electrode as a function of the deposition angle. A porosity of 0% represents a dense ITO electrode. FIG. 6 clearly indicates that the refractive index of an ITO electrode changes with the deposition angle. In FIG. 6, the refractive index was measured by ellipsometry. In general, the porosity (P) (i.e., the volume ratio between the material and air) may be determined from the refractive index ($n_{eff}$), based on a linear volume approximation. A relationship between porosity and the refractive index is shown in eq. (1) as:

$$n_{eff} = n_{air}P + n_{material}(1-P) \quad (1)$$

where $n_{air}$ and $n_{material}$ represent the refractive indices of air and the dense material, respectively.

Although the formation of index-modified (and index-matched) electrodes is described with respect to porosity and oblique-angle deposition, it is also contemplated that index-modified electrodes may be formed using sputtering, e-beam evaporation or spin-on deposition. For example, if sputtering is used, co-sputtering of two different materials may be used to change the refractive index, where the modified refractive index would include an average of the refractive indices of the two materials. As another method, spin-on deposition with nanoparticle-containing material may be used. According to yet another method, a spin-on process may be used that includes a porosity agent (e.g., a chemical agent that causes the electrode film to become porous via nanopores).

Figure 7A:
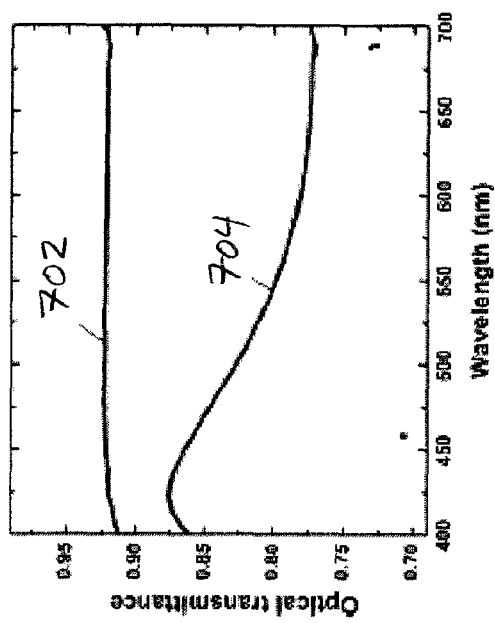
FIGS. 7A and 7B are graphs of optical transmittance as a function of wavelength and electrode thickness, respectively, of an exemplary porous electrode and a conventional electrode.
Figure 7B:
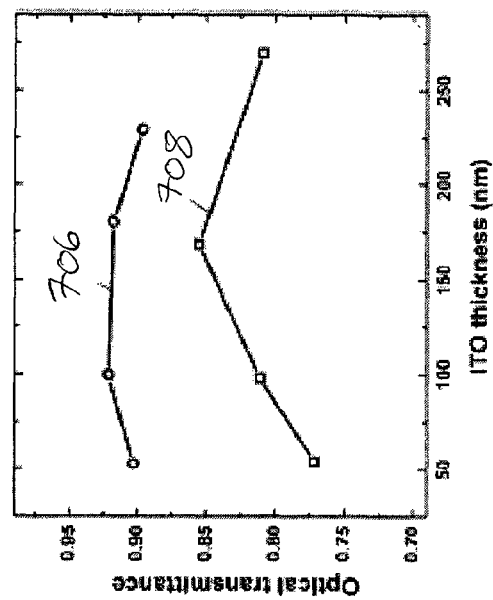

Referring next to FIGS. 7A and 7B, examples of measured optical transmittance as a function of wavelength and electrode thickness for an index-matched electrode and a conventional electrode are shown. In particular, FIG. 7A shows a measured normal-incidence optical transmittance of an index-matched porous ITO electrode (curve 702) and a conventional dense ITO electrode (curve 704) as a function of wavelength; and FIG. 7B shows a measured normal-incidence optical transmittance of an index-matched porous ITO electrode (curve 706) and a conventional dense ITO electrode (curve 708) as a function of electrode thickness.

In FIGS. 7A and 7B, the device structure includes a glass substrate and a bottom ITO electrode (either a conventional dense electrode or a porous electrode). In FIG. 7A, the thickness of each ITO electrode was 100 nm. In FIG. 7B, a wavelength-averaged transmittance from 400-700 nm at various ITO thicknesses was determined. In FIGS. 7A and 7B, the porous and conventional ITO electrodes were each formed on a glass substrate and measured at a temperature of 300K.

As shown in FIG. 7A, the index-matched porous ITO film formed on a glass substrate (curve 702) shows an improved transmittance over a conventional dense ITO film formed on the glass substrate (curve 704). Moreover, the porous ITO film has uniform transmittance of about 92% for all wavelength, whereas the transmittance of the dense ITO film with a same thickness fluctuates between about 77% and 87%.

As shown in FIG. 7B, the index-matched porous ITO films with each of the four thicknesses have improved transmittance compared to the conventional dense ITO films. The transmittance enhancement ranges between about 10% and 17%, dependent on the film thickness, and averages to about 12%. Considering the much larger refractive contrast at the air/porous ITO interface than that at the liquid crystal/porous ITO interface in a real LCD apparatus, the effect of the index matching may be approximately doubled in real LCD apparatus.

In general, the transmittance of porous electrodes (such as ITO films on a glass substrate) is generally less sensitive to film thickness and wavelength than conventional dense electrodes (such as ITO films). For example, in conventional dense ITO films, conditions for constructive or destructive interference may occur and may be significant (due to a large refractive index difference), which may result in a modulation of transmitted light as compared with incident light. In contrast, because porous ITO films may substantially be refractive index-matched to the refractive index of the adjacent substrate, interference effects may be reduced. Thus, the porous ITO electrode may be insensitive to a variation of film thickness and wavelength.

Figure 8:
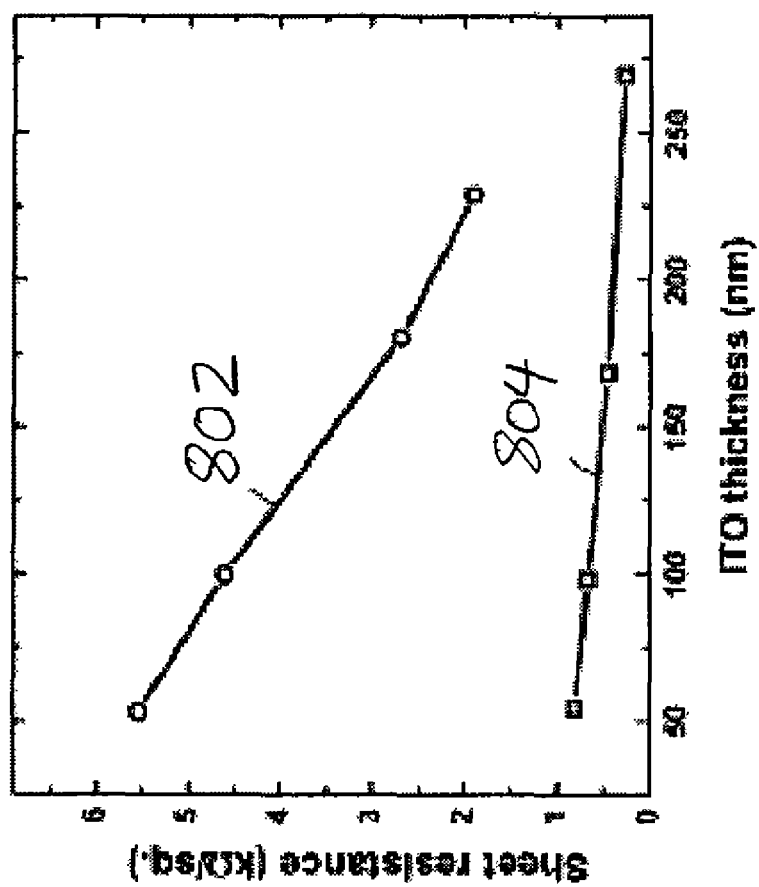
FIG. 8 is a graph of sheet resistance as a function of electrode thickness for an exemplary porous electrode and a conventional electrode.

Referring next to FIG. 8, a graph of measured sheet resistance as a function of electrode thickness is shown for a porous ITO electrode (curve 802) and a conventional dense ITO electrode (curve 804). Sheet resistance was measured for both an index-matched porous ITO and a conventional dense ITO structures by the Eddy-current method. In FIG. 8, both the porous and conventional electrodes were formed on a glass substrate and measured at a temperature of 300K.

FIG. 8 indicates that the sheet resistance of dense ITO films is between about 300-800 Ω/sq with an ITO film thickness range of about 50-270 nm. The sheet resistance of the porous ITO films ranges from about 1000-5500 Ω/sq. A decrease of the sheet resistance versus thickness, for both the porous and the dense ITO films, was shown in FIG. 8.

The porous ITO films showed higher sheet resistance as compared to the dense ITO films. The porous ITO films may have more restrictions for current flow than the dense ITO, because of a porosity of about 55% and low lateral connectivity between ITO nano pillars structures, which may contribute to the higher sheet resistance of the porous ITO films. However, the high sheet resistance of the index-matched porous ITO films may be compensated by increasing the film thickness without deteriorating the transmittance, as shown in FIG. 7B. Additional techniques may also be applied to reduce the sheet resistance of the porous ITO electrode, such as applying an additional blanket layer of ITO film.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. An image display structure comprising:
    a liquid crystal layer disposed between opposing substrates; and
    first and second transparent electrodes disposed between the liquid crystal layer and the respective opposing substrates, wherein at least one of the first and second transparent electrodes includes a porosity such that a refractive index of the respective transparent electrode is reduced.

2. The image display structure according to claim 1, wherein the porosity is between about 1% and about 80%.

3. The image display structure according to claim 1, wherein the refractive index of the at least one transparent electrode is between a refractive index of the liquid crystal layer and a refractive index of the adjacent substrate.

4. The image display structure according to claim 1, further comprising at least one thin film transistor electrically coupled to the first and second transparent electrodes.

5. The image display structure according to claim 1, wherein the first and second transparent electrodes are formed from at least one of indium-tin-oxide (ITO), zinc oxide (ZnO) or aluminum zinc oxide (AlZnO).

6. The image display structure according to claim 1, wherein the at least one transparent electrode including the porosity includes two or more porous layers.

7. The image display structure according to claim 6, wherein the refractive index of the at least one transparent electrode having the porosity is based on an average refractive index of each of the porous layers.

8. The image display structure according to claim 6, wherein each of the porous layers includes a different porosity.

9. The image display structure according to claim 8, wherein each of the porous layers has a different refractive index corresponding to the porosity of the respective porous layer.

10. An apparatus for displaying an image comprising:
a light source for providing incident light in a wavelength band;
a plurality of different color filters each configured to transmit one band of light within the wavelength band; and
a display structure disposed between the light source and the plurality of different color filters, the display structure including:
first and second transparent electrodes, and
a liquid crystal layer disposed between the first and second transparent electrodes,
wherein at least one of the first and second transparent electrodes includes a porosity such that a refractive index of the respective transparent electrode is reduced.

11. The apparatus according to claim 10, wherein the refractive index of the at least one transparent electrode is substantially matched to at least one of the refractive index of the liquid crystal layer or the refractive index of the adjacent material.

12. The apparatus according to claim 10, wherein the refractive index of the at least one transparent electrode is between a refractive index of the liquid crystal layer and an adjacent material disposed on the corresponding transparent electrode.

13. The apparatus according to claim 10, wherein the at least one transparent electrode including the porosity includes one or more porous regions corresponding to regions through which the incident light passes.

14. The apparatus according to claim 10, wherein each of the first and second transparent electrodes includes a respective porosity.

15. The apparatus according to claim 10, wherein the porosity is between about 1% and about 80%.

16. The apparatus according to claim 10, wherein the at least one transparent electrode including the porosity includes two or more porous layers.

17. The apparatus according to claim 16, wherein the refractive index of the at least one transparent electrode having the porosity is based on an average refractive index of each of the porous layers.

18. The apparatus according to claim 16, wherein each of the porous layers includes a different porosity.

19. A method of forming an image display structure, the method comprising:
disposing a liquid crystal layer between opposing substrates;
disposing first and second transparent electrodes between the liquid crystal layer and the respective opposing substrates; and
forming at least one of the first and second transparent electrodes such that the respective transparent electrode has a refractive index modified toward at least one of a refractive index of the liquid crystal layer and a refractive index of the adjacent substrate.

20. The method according to claim 19, wherein forming the at least one transparent electrode includes:
disposing a combination of first and second materials having respective first and second refractive indices on the liquid crystal layer,
wherein the modified refractive index of the at least one transparent electrode is an average of the first and second refractive indices.

21. The method according to claim 20, wherein the at least one transparent electrode is formed by at least one of a sputtering process, an e-beam evaporation process or a spin-on deposition process.

22. The method according to claim 19, wherein forming the at least one transparent electrode includes forming the at least one transparent electrode with a porosity corresponding to the modified refractive index.

23. The method according to claim 22, wherein the at least one transparent electrode is formed by an oblique-angle deposition process.

24. The method according to claim 23, wherein the modified refractive index of the at least one transparent electrode is selected based on a deposition angle of the oblique-angle deposition process.

25. The method according to claim 22, wherein the porosity is selected from between about 1% and about 80%.

26. The method according to claim 22, wherein forming the at least one transparent electrode includes forming two or more porous layers,
wherein the modified refractive index is based on an average refractive index of each of the porous layers.

* * * * *